United States Patent
Chang

(10) Patent No.: US 8,149,373 B2
(45) Date of Patent: Apr. 3, 2012

(54) LIQUID CRYSTAL DISPLAY

(75) Inventor: Chao-Jen Chang, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 526 days.

(21) Appl. No.: 12/473,273

(22) Filed: May 28, 2009

(65) Prior Publication Data

US 2010/0302497 A1    Dec. 2, 2010

(51) Int. Cl.
*G02F 1/1339* (2006.01)
(52) U.S. Cl. .................. 349/156; 349/155; 349/157
(58) Field of Classification Search .................. None
See application file for complete search history.

(56) References Cited

U.S. PATENT DOCUMENTS

| 6,337,730 | B1 | 1/2002 | Ozaki et al. | |
| 6,339,462 | B1 * | 1/2002 | Kishimoto et al. | 349/156 |
| 2004/0160567 | A1 * | 8/2004 | Kozhukh | 349/155 |
| 2008/0111965 | A1 * | 5/2008 | Tomita | 349/156 |
| 2010/0231843 | A1 * | 9/2010 | Tadaki | 349/156 |

FOREIGN PATENT DOCUMENTS

| CN | 1837905 A | 9/2006 |
| CN | 2006100591859 A | 9/2006 |
| JP | 112808 A | 1/1999 |
| JP | 11002808 A | 1/1999 |

* cited by examiner

*Primary Examiner* — Hemang Sanghavi
(74) *Attorney, Agent, or Firm* — Chun-Ming Shih

(57) ABSTRACT

A liquid crystal display (LCD) includes a first substrate, a second substrate, a mesh spacer, and a liquid crystal. The first substrate includes a black matrix. The mesh spacer is formed by a plurality of longitudinal strips and a plurality of transverse strips, and is disposed on the black matrix and is configured between the first substrate and the second substrate. The longitudinal strips and the transverse strips have different thickness. The liquid crystal is disposed in spaces formed by the first substrate, the second substrate, and the mesh spacer.

14 Claims, 6 Drawing Sheets

LIQUID CRYSTAL DISPLAY

BACKGROUND OF THE INVENTION

1. Field of the Invention

The present invention relates to a liquid crystal display (LCD), and more particularly to a ferroelectric LCD.

2. Related Art

Currently, ferroelectric liquid crystals are applied in color sequential displays due to having a quick response. As the ferroelectric liquid crystals are one kind of smectic liquid crystals and the viscosity coefficient of the smectic liquid crystals is rather high, in order to successfully inject the liquid crystals into a space between two substrates while ensuring a uniform distribution of the liquid crystals, the panels and the liquid crystals are both heated, and then the panels are cooled, so as to facilitate the injection of the liquid crystals.

However, the liquid crystals may easily be coagulated with a reducing fluidity when being cooled down due to the high viscosity coefficient in the injection of the ferroelectric liquid crystals. Moreover, it does not have a color filter in the color sequential display, a mura defect may appear on the conventional color sequential display.

Furthermore, the thermal expansion coefficient of the ferroelectric liquid crystals is found to be much higher than that of glass substrates. Thus, when being cooled down after being heated, the liquid crystals shrink in volume to result in an adhesion stress on the surface of the polyimide (PI), thus causing zig-zag defects and resulting in an orientation defect of the liquid crystals.

Therefore, in order to solve the above problem, an assembly structure with a plurality of rectilinear barrier members has been introduced in U.S. Pat. No. 5,559,621, such that liquid crystals may flow in the assembly structure. However, when the liquid crystals flow in a direction different from the aligned direction, the zig-zag defects are also generated, and the orientation defects occur to the liquid crystals. The longer the flowing path of the liquid crystals is, the worse the defects will be. Even if the liquid crystals are once again heated to the isotropic phase, this kind of defects still exists and is difficult to be eliminated for the assembly structure with a plurality of rectilinear barrier members disclosed in U.S. Pat. No. 5,559,621.

SUMMARY OF THE INVENTION

The present invention is directed to a liquid crystal display (LCD) for reducing the probability of zig-zag defects.

Accordingly, the present invention is directed to a liquid crystal display (LCD), The LCD includes a first substrate, a second substrate, a mesh spacer, and a liquid crystal. The first substrate includes a black matrix. The mesh spacer is formed by a plurality of longitudinal strips and a plurality of transverse strips, and disposed on the black matrix and configured between the first substrate and the second substrate. In addition, the thicknesses of the longitudinal strips and the transverse strips are different. The liquid crystals are disposed in spaces formed by the first substrate, the second substrate, and the mesh spacer.

In one embodiment, the thickness of the longitudinal strips differs from a thickness of the transverse strips by 0.1 µm to 20 µm.

In one embodiment, each of the longitudinal strips has a first top surface, each of the transverse strips has a second top surface, and the first top surface and the second top surface are not coplanar.

In one embodiment, the mesh spacer comprises a plurality of recesses, and the bottom surfaces of the recesses all face the second substrate.

In one embodiment, the mesh spacer is made of a thermosetting material or an ultraviolet (UV)-curing material.

In one embodiment, the mesh spacer is made of an acrylic resin.

In one embodiment, the mesh spacer further comprises a plurality of first protrusions disposed on one side edge of the mesh spacer, and the first protrusions is in a shape of a semicircle, a trapezoid, or a cone.

In one embodiment, the mesh spacer further comprises a plurality of second protrusions disposed opposite to the first protrusions.

In one embodiment, the mesh spacer has a top surface and a bottom surface, and the width of the top surface is larger than the width of the bottom surface.

In one embodiment, the width of the mesh spacer is smaller than the width of the black matrix.

In one embodiment, the liquid crystal is a ferroelectric liquid crystal.

In one embodiment, the first substrate and the second substrate are formed by a transparent conductive material.

In one embodiment, the transparent conductive material comprises an indium tin oxide (ITO) or indium zinc oxide (IZO).

Accordingly, the present invention is directed to a liquid crystal display (LCD), in which a mesh spacer disposed on a black matrix has different structural designs in the longitudinal and transverse directions. Therefore, when liquid crystals are filled in the mesh spacer having varied step configurations or recess/protrusion structures, the liquid crystals can flow uniformly to enhance the uniformity during the injection of the liquid crystals. As such, the LCD of the present invention is applicable to a display device.

In order to make the above features and advantages of the present invention more comprehensible, the present invention is described below through the embodiments with reference to the accompanying drawings.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
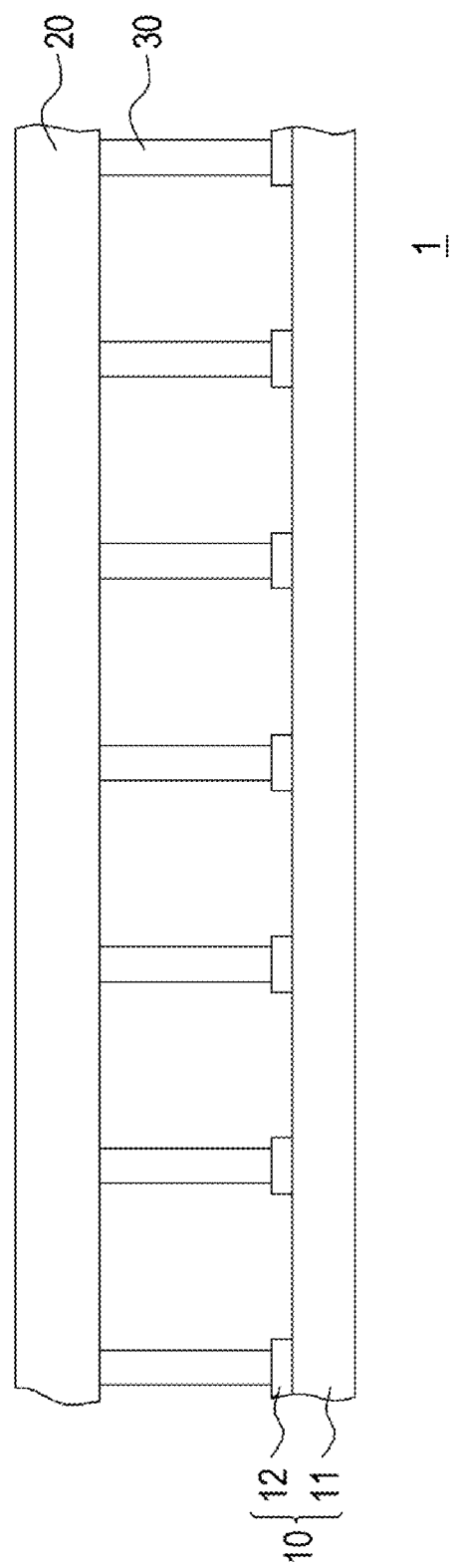
FIG. 1 is a side view of an LCD according to an embodiment of the present invention.
Figure 2:
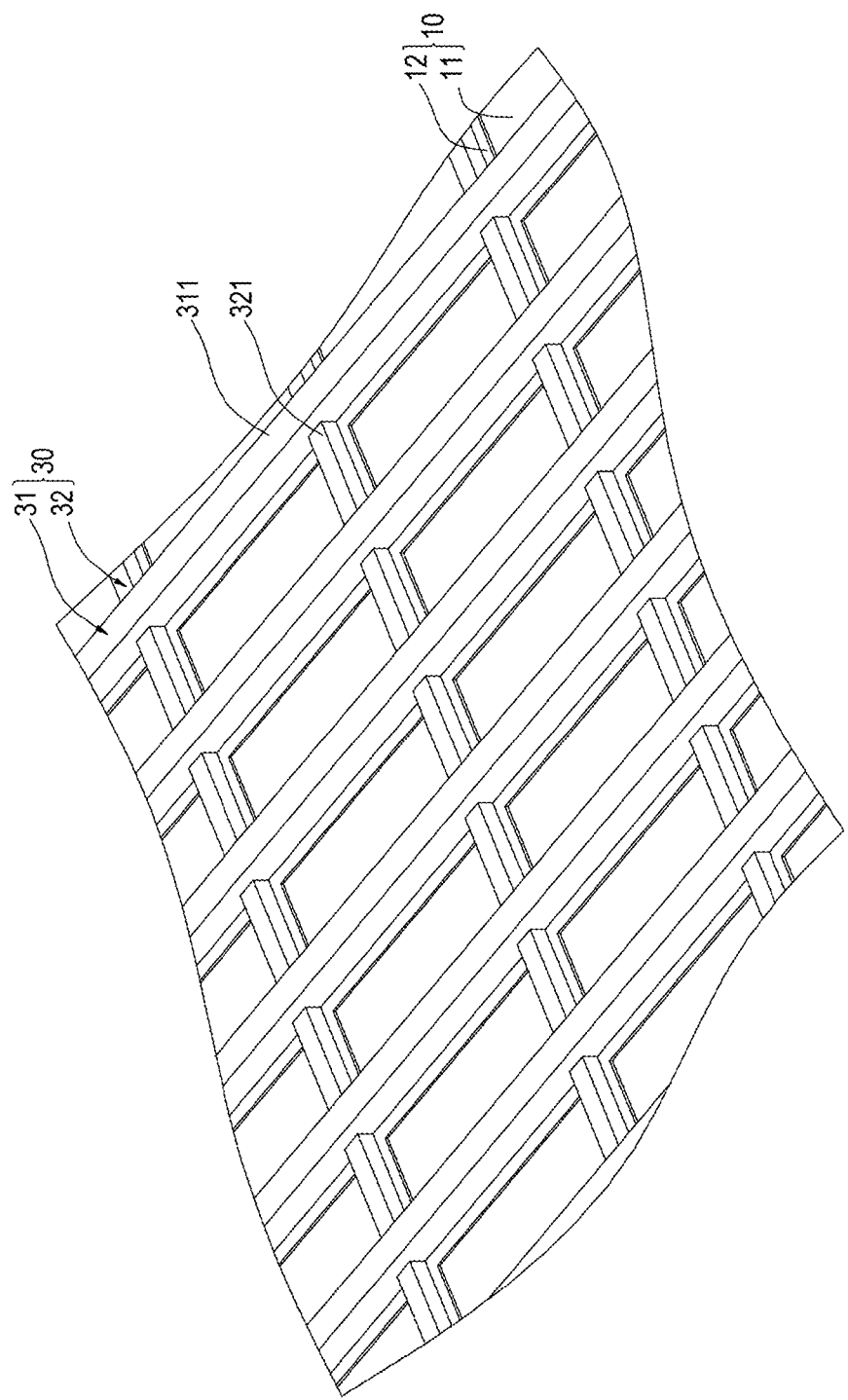
FIG. 2 is a schematic three-dimensional view of a mesh spacer according to an embodiment of the present invention.
Figure 3:
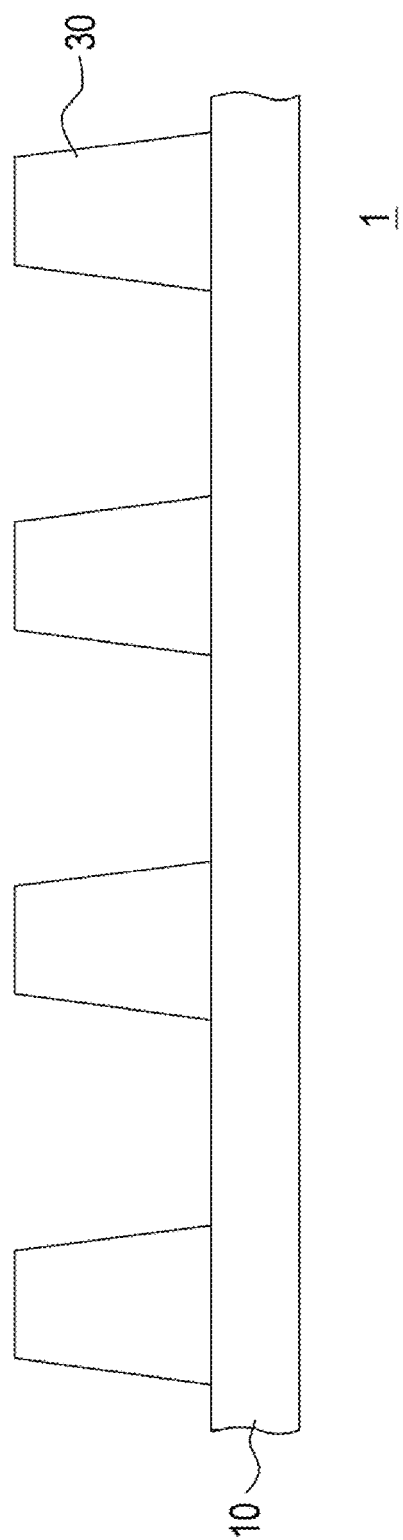
FIG. 3 is a side view of a mesh spacer according to an embodiment of the present invention.

FIG. 1 is a side view of an LCD according to an embodiment of the present invention. FIG. 2 is a schematic three-dimensional view of a mesh spacer according to an embodiment of the present invention. FIG. 3 is a side view of a mesh spacer according to an embodiment of the present invention. Referring to FIGS. 1, 2, and 3, an LCD 1 includes a first substrate 10, a second substrate 20, a mesh spacer 30, and a liquid crystal (not shown).

The liquid crystal (not shown) is disposed in spaces formed by the first substrate 10, the second substrate 20, and the mesh spacer 30. The liquid crystal is a ferroelectric liquid crystal.

The first substrate 10 includes a black matrix 12 and a transparent conductive substrate 11. The transparent conductive substrate 11 is formed by a transparent conductive material including, for example, indium tin oxide (ITO) or indium zinc oxide (IZO).

The second substrate 20 also includes a transparent conductive substrate formed by a transparent conductive material including, for example, ITO or IZO.

The mesh spacer 30 is configured between the first substrate 10 and the second substrate 20, and is disposed on the black matrix 12 of the first substrate. Therefore, the mesh spacer 30 is used to limit a gap between the first substrate and the second substrate. Afterwards, the liquid crystal is injected, so as to form the basic construction of the LCD in FIG. 1.

The liquid crystal is filled in the spaces formed by the first substrate 10, the second substrate 20, and the mesh spacer 30 by means of a conventional printing technique such as inkjet printing, gravure printing, screen printing, spray printing, or strip coating.

FIG. 2 is a schematic three-dimensional view of the mesh spacer 30 according to an embodiment of the present invention. Referring to FIG. 2, the mesh spacer 30 is formed by a plurality of longitudinal strips 31 and a plurality of transverse strips 32. It should be particularly noted that, the longitudinal strips 31 and the transverse strips 32 are arranged in a step configuration. Preferably, the thickness of the longitudinal strips 31 differs from that of the transverse strips 32 by 0.1 µm to 20 µm.

For example, as shown in FIG. 2, each of the longitudinal strips 31 has a first top surface 311, each of the transverse strips 32 has a second top surface 321, and the first top surface 311 and the second top surface 321 are not coplanar. In other words, when the longitudinal strip 31 is disposed higher than the transverse strip 32, the first top surface 311 of the longitudinal strip 31 is higher than the second top surface 321 of the transverse strip 32.

Alternatively, the longitudinal strip 31 may be thinner than the transverse strip 32, i.e., the second top surface 321 of the transverse strip 32 is higher than the first top surface 311 of the longitudinal strip 31.

When the longitudinal strips 31 and the transverse strips 32 are arranged in a step configuration, such structural design with a step configuration enables the liquid crystal to flow uniformly, thereby enhancing the uniformity during the injection of the liquid crystals. Moreover, there is a gap between the step configuration and the front substrate, thereby ensuring the above advantage and further improving the uniformity during the injection of the liquid crystal.

Referring to FIG. 2, the mesh spacer 30 is thinner than the black matrix 12, and is thus shielded by the black matrix 12. Meanwhile, the mesh spacer 30 is made of a thermosetting material or a UV-curing material, for example, acrylic resin. As the acrylic resin is highly transparent, the transmission rate of the panel may not be affected. In addition, the mesh spacer 30 encloses an area of one pixel or a plurality of pixels.

The mesh spacer 30 is fabricated in the same manner as the exposure and developing of an ordinary photoresist. It should be noted that, the longitudinal strips 31 and the transverse strips 32 may be made of acrylic resin photoresists with different thermal expansion coefficients, so as to reduce the adhesion force of an interface layer between the liquid crystal and a protection layer.

FIG. 3 is a side view of the mesh spacer 30 according to another embodiment of the present invention. Referring to FIG. 3, the mesh spacer 30 has a top surface and a bottom surface, and the width of the top surface is smaller than that of the bottom surface, i.e., the mesh spacer 30 is designed into a narrow top and wide bottom configuration.

Specifically, at least one of the longitudinal strips 31 and the transverse strips 32 that constitute the mesh spacer 30 may have such a design of narrow top and wide bottom. For example, both the longitudinal strips 31 and the transverse strips 32 have the design of narrow top and wide bottom, or only the longitudinal strips 31 or the transverse strips 32 have the design of narrow top and wide bottom.

Therefore, the mesh spacer 30 formed by the longitudinal strips 31 and the transverse strips 32 may be used to replace the spacer layer used in the conventional display panel, so as to improve the uniformity of the panel. Furthermore, the mesh spacer 30 may not only be used in a ferroelectric color sequential panel, but also used in an ordinary ferroelectric display device.

Figure 4:
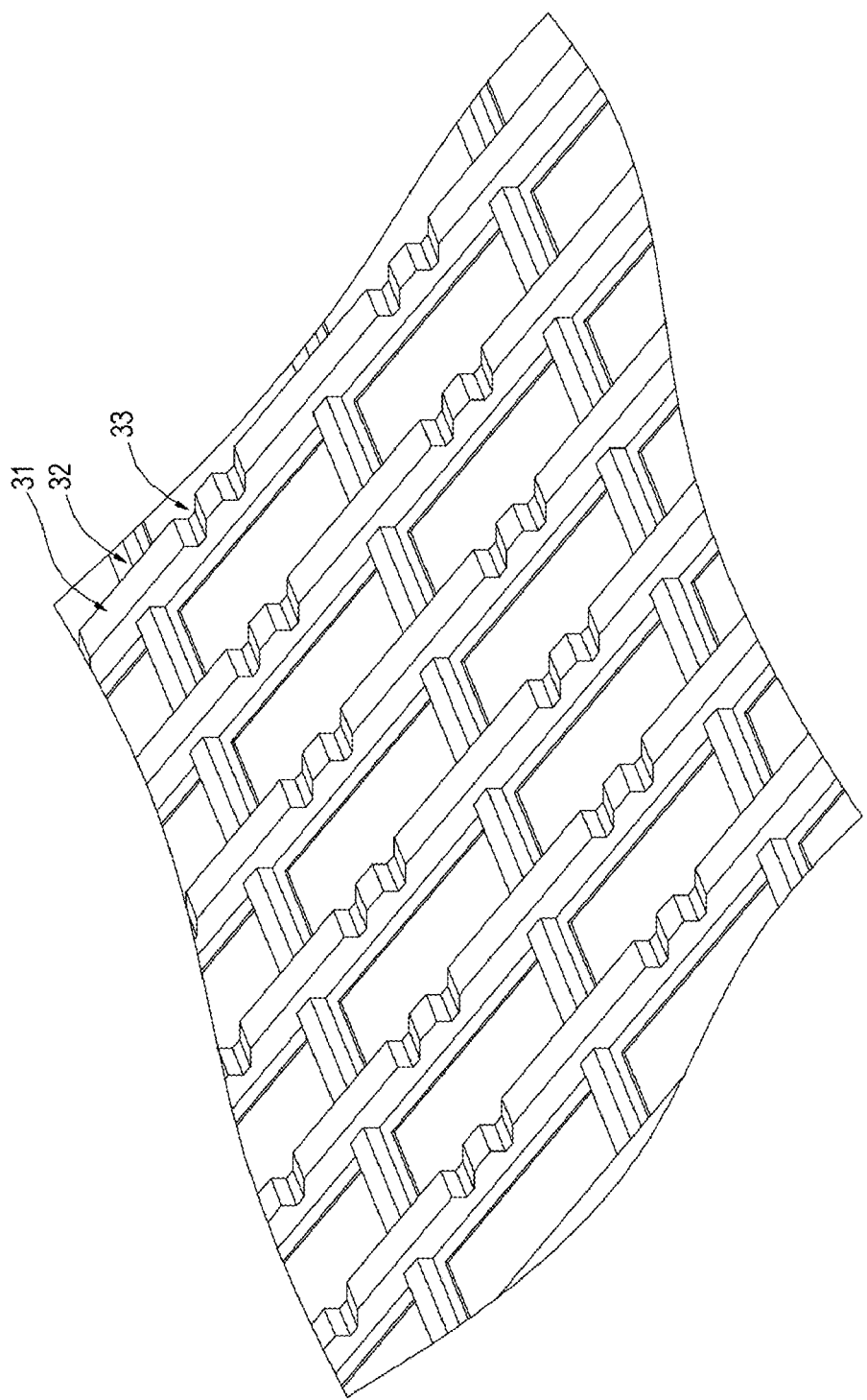
FIG. 4 is a schematic three-dimensional view of a mesh spacer according to another embodiment of the present invention.

FIG. 4 is a schematic three-dimensional view of the mesh spacer 30 according to another embodiment of the present invention. Referring to FIG. 4, the LCD of this embodiment is similar to the LCD 1 of the above embodiment, and the difference there-between only lies in the shape of the mesh spacer 30.

In this embodiment, the mesh spacer 30 is also formed by a plurality of longitudinal strips 31 and a plurality of transverse strips 32. However, the shape of the longitudinal strips 31 or the transverse strips 32 in this embodiment is different from that of the longitudinal strips 31 or the transverse strips 32 in FIG. 2.

For example, as shown in FIG. 4, the difference is that each longitudinal strip 31 has a plurality of recesses 33, and the bottom surfaces of the recesses 33 all face the second substrate 20. That is to say, the top surface of each longitudinal strip 31 appears an uneven level.

Similarly, the recesses 33 may also be formed on the top surface (not shown) of each transverse strip 32. In other words, at least one of the longitudinal strips 31 and the transverse strips 32 may have the recesses 33. For example, both the longitudinal strips 31 and the transverse strips 32 have the recesses 33, or only the longitudinal strips 31 or the transverse strips 32 have the recesses 33. By adopting the design of the recesses, the uniformity during the injection of the liquid crystals is enhanced.

Figure 5:
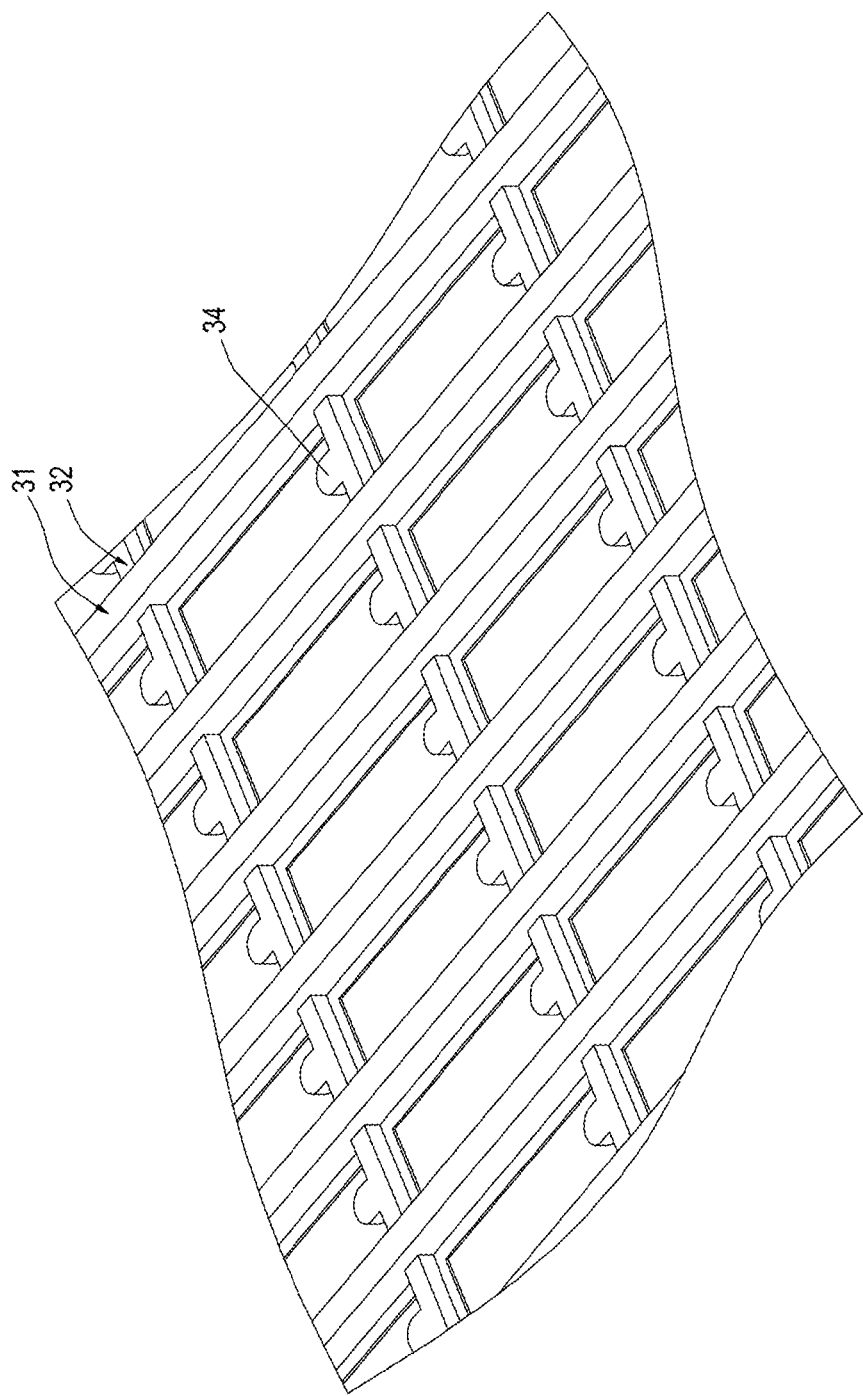
FIG. 5 is a schematic three-dimensional view of a mesh spacer according to another embodiment of the present invention.

FIG. 5 is a schematic three-dimensional view of the mesh spacer 30 according to another embodiment of the present invention. Referring to FIG. 5, the LCD of this embodiment is similar to that of the above embodiment, and the difference there-between only lies in the shape of the mesh spacer 30.

In this embodiment, the mesh spacer 30 includes a structural design of at least one protrusion 34. For example, referring to FIG. 5, each transverse strip 32 of the mesh spacer 30 has a plurality of protrusions 34 disposed on one side edge of the transverse strip 32. The protrusion 34 is in the shape of a semicircle, a trapezoid, or a cone.

When the liquid crystals are filled between the substrates by printing, as a large amount of the liquid crystals are filled in at one time, bubbles may be easily produced among the liquid crystals and may be difficult to be removed. However, such protrusions 34 are designed for reducing the bubbles.

Figure 6:
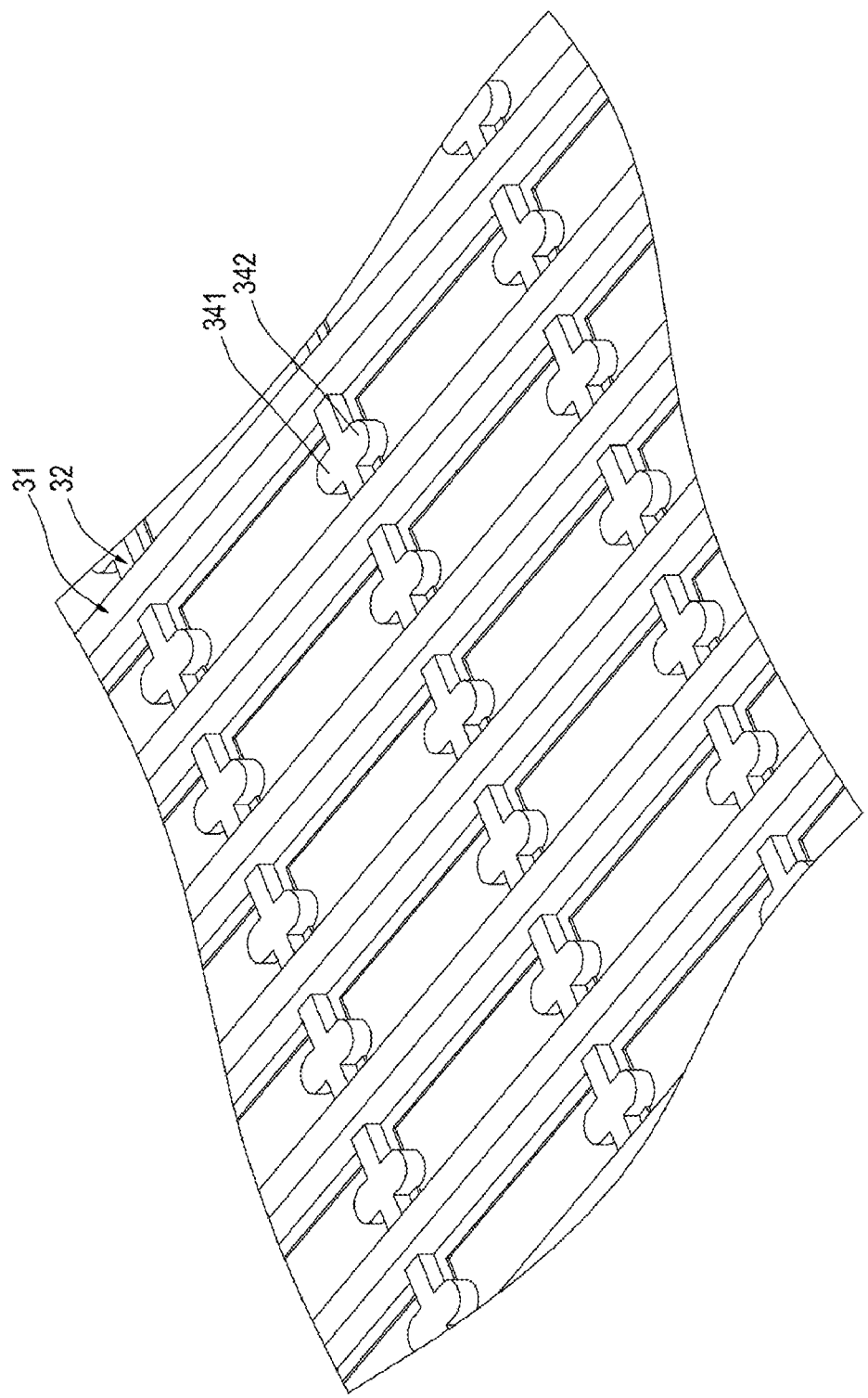
FIG. 6 is a schematic three-dimensional view of a mesh spacer according to another embodiment of the present invention.

Furthermore, the protrusions 34 may also be disposed on two side edges of each transverse strip 32. That is to say, each transverse strip 32 includes a plurality of first protrusions 341 and a plurality of second protrusions 342, and the first protrusions 341 are disposed opposite to the second protrusions 342 (as shown in FIG. 6).

Definitely, the protrusions may also be disposed on one side edge or both side edges of each longitudinal strip 31. That is to say, at least one of the longitudinal strips 31 and the transverse strips 32 may have the protrusions 34. For example, both the longitudinal strips 31 and the transverse strips 32 have the protrusions 34, or only the longitudinal strips 31 or the transverse strips 32 have the protrusions 34. By adopting the design of such protrusions 34, the uniformity during the injection of the liquid crystals is enhanced.

It should be noted that, the mesh spacers 30 in FIGS. 4 and 5 are only examples for making illustrations, instead of limiting the present invention. Specifically, the design of the recesses 33 in FIG. 4 may be combined with other embodiments of the present invention, and the design of the protrusions 34 in FIG. 5 may also be combined with other embodiments of the present invention.

For example, in other embodiments (not shown), the mesh spacer 30 may include both the recesses 33 in FIG. 4 and the protrusions 34 in FIG. 5. That is to say, the longitudinal strips 31 include both the recesses 33 in FIG. 4 and the protrusions 34 in FIG. 5, or the transverse strips 32 include both the recesses 33 in FIG. 4 and the protrusions 34 in FIG. 5, or the longitudinal strips 31 and the transverse strips 32 include both the recesses 33 in FIG. 4 and the protrusions 34 in FIG. 5 at the same time.

In view of the above, in the LCD of the present invention, the mesh spacer disposed on the black matrix has different structural designs in the longitudinal and transverse directions. Therefore, when liquid crystals are filled in a mesh spacer having varied step configurations or recess/protrusion structures, the liquid crystals can flow uniformly, thus enhancing the uniformity during the injection of the liquid crystals.

Though the present invention has been disclosed above by the preferred embodiments, they are not intended to limit the present invention. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display (LCD), comprising:
a first substrate, having a black matrix;
a second substrate;
a mesh spacer, formed by a plurality of longitudinal strips and a plurality of transverse strips, disposed on the black matrix, and configured between the first substrate and the second substrate, wherein the longitudinal strips and the transverse strips have different thickness; and
a liquid crystal, disposed in spaces formed by the first substrate, the second substrate, and the mesh spacer.

2. The LCD according to claim 1, wherein a thickness of the longitudinal strips differs from a thickness of the transverse strips by 0.1 µm to 20 µm.

3. The LCD according to claim 1, wherein each of the longitudinal strips has a first top surface, each of the transverse strips has a second top surface, and the first top surface and the second top surface are not coplanar.

4. The LCD according to claim 1, wherein the mesh spacer comprises a plurality of recesses, and bottom surfaces of the recesses all face the second substrate.

5. The LCD according to claim 1, wherein the mesh spacer is made of a thermosetting material or an ultraviolet (UV)-curing material.

6. The LCD according to claim 1, wherein the mesh spacer is made of an acrylic resin.

7. The LCD according to claim 1, wherein the mesh spacer further comprises a plurality of first protrusions disposed on one side edge of the mesh spacer.

8. The LCD according to claim 7, wherein each of the first protrusions is in a shape of a semicircle, a trapezoid, or a cone.

9. The LCD according to claim 7, wherein the mesh spacer further comprises a plurality of second protrusions disposed opposite to the first protrusions.

10. The LCD according to claim 1, wherein the mesh spacer has a top surface and a bottom surface, and a width of the top surface is larger than a width of the bottom surface.

11. The LCD according to claim 1, wherein a width of the mesh spacer is smaller than a width of the black matrix.

12. The LCD according to claim 1, wherein the liquid crystal is a ferroelectric liquid crystal.

13. The LCD according to claim 1, wherein the first substrate and the second substrate are formed by a transparent conductive material.

14. The LCD according to claim 13, wherein the transparent conductive material comprises an indium tin oxide (ITO) or indium zinc oxide (IZO).

* * * * *